United States Patent [19]

Jayant

[11] 3,997,844
[45] Dec. 14, 1976

[54] SIGNAL SELECTION IN DIVERSITY TRANSMISSION SYSTEMS

[75] Inventor: Nuggehally Sampath Jayant, Summit, N.J.

[73] Assignee: Bell Telephone Laboratories, Incorporated, Murray Hill, N.J.

[22] Filed: Apr. 9, 1975

[21] Appl. No.: 566,382

[52] U.S. Cl. .............................. 325/304; 235/181; 325/56
[51] Int. Cl.² ........................................ H04B 7/02
[58] Field of Search ............ 325/56, 302, 305, 324, 325/363, 367, 371, 474, 476, 304, 306; 343/205; 328/104, 154, 163; 235/181

[56] References Cited

UNITED STATES PATENTS

| 2,059,081 | 10/1936 | Beers | 325/370 |
|---|---|---|---|
| 2,982,852 | 5/1961 | Fano | 325/474 |
| 3,097,348 | 7/1963 | Fiske | 340/164 |
| 3,168,699 | 2/1965 | Sunstein et al. | 325/472 |
| 3,652,939 | 3/1972 | Levasseur | 325/367 |
| 3,670,275 | 6/1972 | Kalliomaki | 325/370 |
| 3,700,876 | 10/1972 | Gray | 235/181 |
| 3,737,783 | 6/1973 | Oswald | 325/367 |

*Primary Examiner*—Robert L. Richardson
*Assistant Examiner*—Marc E. Bookbinder
*Attorney, Agent, or Firm*—H. L. Logan; Robert O. Nimtz

[57] ABSTRACT

Apparatus is disclosed for selecting a preferred message signal from a plurality of received diversity message signals. Provided are autocorrelators for developing an autocorrelation function value of each received signal, and selectors for assigning as the preferred message signal the received signal having the largest autocorrelation function value.

6 Claims, 1 Drawing Figure

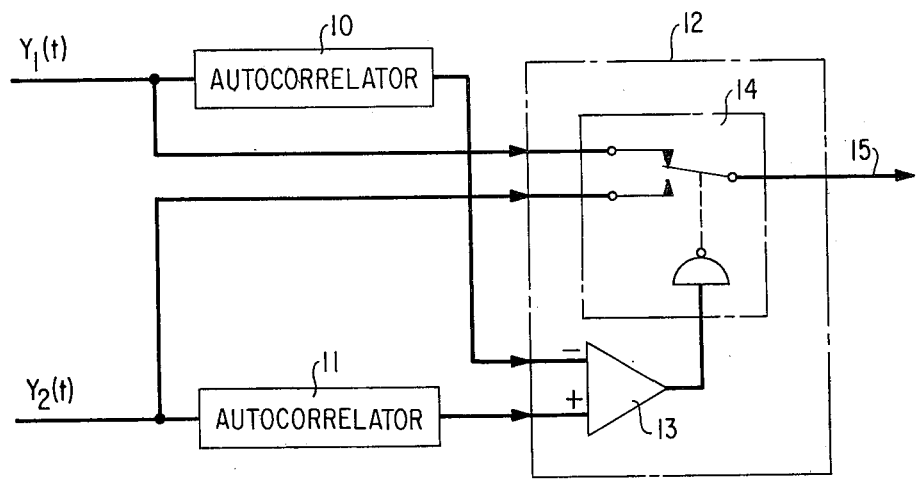

SIGNAL SELECTION IN DIVERSITY TRANSMISSION SYSTEMS

BACKGROUND OF THE INVENTION

1. Field of the Invention

This invention relates to signal processing, and, more particularly, to signal processing in diversity transmission systems.

2. Description of the Prior Art

Digital communication over radio transmission networks is susceptible to errors. These errors are caused by signal fading due to atmosphereic conditions and due to signal attenuation caused by physical structures in urban environments, and by electromagnetic interferences from other transmitting systems. Signal transmission over a mobile radio channel is particularly subject to errors due to fading. These errors manifest themselves in clusters or bursts of errors.

The various methods which have been devised to reduce the effect of burst errors generally apply one of two basic approaches: protection of each bit or each word of transmission; or protection of the message as a whole. In accordance with the former approach, error detection and/or error correction codes are generally used. In accordance with the latter approach, it has been found advantageous to use space diversity or time diversity transmission. In space diversity transmission, a transmitted signal is received by a plurality of receiving systems, and the message signal is derived by manipulation of the received signals. In time diversity transmission, the signal is transmitted a number of times by a single transmitter, and the message signal is, similarly, derived by manipulation of the received signals.

For example, Kalliomaki et al, U.S. Pat. No. 3,670,275, issued June 13, 1972, describes a diversity system which measures the broadband signal-to-noise ratio of the signals received from diverse antennae and, based on the signal-to-noise ratio measurements, selects the signal of a particular antenna.

Another system, described by George L. Beers in U.S. Pat. No. 2,059,081, issued Oct. 27, 1936, has a plurality of antennae and switching means for successively connecting the antennae to the input circuit of the single receiver. Selection of an optimum antenna is based upon a measure of the signal's strength at the antenna's output.

Still another system is described by Oswald et al in U.S. Pat. No. 3,737,783, issued June 5, 1973. Oswald et al disclose a space diversity system comprising two antennae having their signals applied to an adder, a subtractor, and to various cross-correlators which develop output signals that are combined to form a message signal.

The above prior art systems require fairly complex and often expensive circuitry for receiving and developing the desired message signal.

SUMMARY OF THE INVENTION

It is an object of this invention, therefore, to provide a simple and an inexpensive approach for deciding which of a plurality of signals in a diversity transmission system is to be chosen as the preferred message signal.

It is another object of this invention to perform the above selection in time diversity as well as in space diversity systems.

These and other objectives are achieved by selecting the preferred message signal from the plurality of received message signals on the basis of the autocorrelation values of the received signals. More specifically, autocorrelators are provided for developing the autocorrelation value of each received signal, and a selector is provided for selecting as the preferred-message-signal that message signal which possesses the maximum autocorrelation value. The signal having the maximum autocorrelation value is the signal that is least adulterated by noise. In a preferred embodiment the autocorrelation value developed is responsive solely to the sign of the correlated signal.

BRIEF DESCRIPTION OF THE DRAWING

The single FIGURE of the drawing depicts one embodiment of this invention for a diversity system having two received signals.

DETAILED DESCRIPTION

In a diversity communication system, the received signals of a particular message transmission contain the same transmitted message but have different distortion and noise components. It has been found that some measure of the additive noise can be had by computing the autocorrelation functions of the received signals. Particularly, it has been found that the value of the autocorrelation function of one received signal is larger than the value of the autocorrelation function of another received signal when the additive noise of the former signal is smaller than the additive noise of the latter signal.

In accordance with these findings, in diversity communication systems comprising an embodiment of this invention, a particular preferred signal is selected from among a plurality of received signals by taking into account the received signals' autocorrelation function value. More specifically, the autocorrelation function $\phi(\tau)$ of each received signal is evaluated at a preselected $\tau$, and the received signal developing the largest autocorrelation function value is selected as the preferred signal.

The single drawing appended hereto depicts an embodiment of this invention for a diversity communication system having two received signals $Y_1(t)$ and $Y_2(t)$. In the drawing, signals $Y_1(t)$ and $Y_2(t)$ are applied to autocorrelators 10 and 11, respectively. Autocorrelator 10 generates the autocorrelation function of the signal $Y_1(t)$, and autocorrelator 11 generates the autocorrelation function of the signal $Y_2(t)$. The preferred signal selection is accomplished in selector 12 which is responsive to the signals $Y_1(t)$ and $Y_2(t)$ and to the output signals of autocorrelators 10 and 11. In the depicted embodiment, selector 12 comprises an analog comparator 13, e.g., National Semiconductor Corporation LM106, and a SPDT analog switch 14, e.g., National Semiconductor Corporation AH0014. The analog comparator is connected to the output signals of autocorrelators 10 and 11. It develops a digital signal indicative of which of its inputs is larger in magnitude. Based on the value of this digital signal, analog switch 14 selects the received signal having the largest autocorrelation function value and applies it to its output lead 15.

The selection process can, of course, be accomplished in other ways and with other means. For example, the magnitude comparison and the switching accomplished by elements 13 and 14 can be accomplished in one integrated circuit, e.g., National Semiconductor Corporation analog switch AH0145.

Generally, the autocorrelation function of a signal $Y_1(t)$ is defined as $$\phi(T,\tau) = \int_{T-W}^{T} Y_1(t)Y_1(t+\tau)dt \qquad (1)$$

where $\tau$ is the time delay between the signal and its replica, and W is the span of time (window) over which the autocorrelation function is computed. Although the autocorrelation function of equation (1) can easily be implemented in autocorrelators 10 and 11, a simpler "autocorrelation" function has been found which is sufficient for the purposes of this invention. This simpler function is the integral of the product of the signs of the correlating signals, i.e., $$\phi'(T,\tau) = \int_{T-W}^{T} \text{sgn } Y_1(t) \text{ sgn } Y_1(t+\tau)dt . \qquad (2)$$

Although the autocorrelation function of equation (2) can be computed for any time delay $\tau$, it can be shown that a one word delay, i.e., $\tau = 1$, is a good and, in some respects, a preferred time delay for the autocorrelators used in the embodiments of this invention. This further simplifies the implementation of correlators 10 and 11. Thus, autocorrelators 10 and 11 merely require means for selecting the sign signal of an incoming signal, a one word delay for the selected sign signal, means for developing a product signal indicative of the product of the selected sign signal with the delayed sign signal, and means for accumulating such product signals over the W window, thereby implementing the autocorrelation function of equation (2).

The means for selecting the sign signal may simply be a flip-flop clocked with a proper sampling clock, the means for multiplying may simply be a coincidence gate, and the means for accumulating over the W window may be of a construction similar to that of FIG. 4 of P. Hirsch U.S. Pat. No. 3,717,812 issued Feb. 20, 1973. Other implementations for autocorrelators 10 and 11 are also possible. For example, a slightly modified version of the autocorrelator described by B. LuBow in "Correlation Entering New Fields with Real-Time Signal Analysis," published in Electronics, Oct. 31, 1966 can be used.

I claim:

1. In a communication system having a plurality of diverse signals carrying the same message, apparatus comprising:
    means for developing the autocorrelation function value of each signal of said plurality of diverse signals; and
    means for selecting the signal having the largest autocorrelation function value.

2. In a diversity communication system, apparatus for selecting a preferred message signal from among a plurality of received diversity message signals comprising:
    autocorrelation means responsive to said received message signals for developing the autocorrelation value of each signal of said plurality of received diversity message signals; and
    means responsive to said autocorrelation means for selecting as said preferred message signal that signal which possesses the largest autocorrelation value.

3. In a diversity communication system having two received signals $Y_1(t)$ and $Y_2(t)$, each carrying the same message with independent adulterating noise, apparatus for selecting a perferred-message-signal comprising:
    first means, for developing the autocorrelation value of said $Y_1(t)$ signal;
    second means, for developing the autocorrelation value of said $Y_2(t)$ signal;
    third means, for selecting said $Y_1(t)$ signal when the autocorrelation value of said first means is greater than the autocorrelation value of said second means, and for selecting said $Y_2(t)$ signal when the autocorrelation value of said first means is smaller than the autocorrelation value of said second means.

4. The apparatus of claim 3 wherein said first means integrates, over a preselected time interval, the product of the signals $Y_1(t)$ and $Y_1(t+\tau)$ where $\tau$ is a chosen time delay; and wherein said second means integrates, over the same preselected time interval, the product of the signals $Y_2(t)$ and $Y_2(t+\tau)$ where $\tau$ is the same chosen time delay.

5. The apparatus of claim 3 herein said first means integrates, over a preselected time interval, the product of the signals sgn $Y_1(t)$ and sgn $Y_1(t+\tau)$ where sgn $Y_1(t)$ is representative of the sign of the signal $Y_1(t)$, sgn $Y_1(t+\tau)$ is representative of the sign of the signal $Y_1(t+\tau)$, and $\tau$ is a chosen time delay; and wherein said second means integrates, over the same preselected time interval, the product of the signals sgn $Y_2(t)$ and sgn $Y_2(t+\tau)$ where sgn $Y_2(t)$ is representative of the sign of the signal $Y_2(t)$, sgn $Y_2(t+\tau)$ is representative of the sign of the signal $Y_2(t+\tau)$, and $\tau$ is the same chosen time delay.

6. Apparatus for selecting from among a plurality of diversity message signals the signal having a minimum noise content, said apparatus comprising:
    autocorrelation means responsive to said message signals for developing signals related to the autocorrelation values of said signals, respectively; and
    means responsive to said signals developed by said autocorrelation means for selecting as an output signal the one of said message signals producing the largest signal from said autocorrelation means.

* * * * *